US008652288B2

(12) United States Patent  (10) Patent No.: US 8,652,288 B2
Blinkhorn et al.  (45) Date of Patent: Feb. 18, 2014

(54) REINFORCED ACOUSTICAL MATERIAL HAVING HIGH STRENGTH, HIGH MODULUS PROPERTIES

(75) Inventors: Arthur Blinkhorn, Fenton, MI (US); Terry L. Cheney, Northville, MI (US)

(73) Assignee: OCV Intellectual Capital, LLC, Toledo, OH (US)

(*) Notice: Subject to any disclaimer, the term of this patent is extended or adjusted under 35 U.S.C. 154(b) by 1196 days.

(21) Appl. No.: 11/512,017

(22) Filed: Aug. 29, 2006

(65) Prior Publication Data

US 2008/0057283 A1  Mar. 6, 2008

(51) Int. Cl.
*B32B 37/00* (2006.01)
(52) U.S. Cl.
USPC ................... 156/308.2; 156/62.2
(58) Field of Classification Search
USPC ............. 156/62.2, 166, 180, 181, 308.2, 148
See application file for complete search history.

(56) References Cited

U.S. PATENT DOCUMENTS

| | | | |
|---|---|---|---|
| 2,543,101 A | 2/1951 | Francis | |
| 3,498,770 A | 3/1970 | Phillips et al. | |
| 3,790,655 A | 2/1974 | Cramton | |
| 3,881,222 A | 5/1975 | Roberson | |
| 4,229,397 A | 10/1980 | Fukuta et al. | |
| 4,240,994 A | 12/1980 | Ottenholm | |
| 4,242,398 A | 12/1980 | SEgawa et al. | |
| 4,379,801 A | 4/1983 | Weaver et al. | |
| 4,379,802 A | 4/1983 | Weaver et al. | |
| 4,394,414 A | 7/1983 | Brown et al. | |
| 4,418,031 A | 11/1983 | Doerer et al. | |
| 4,461,804 A | 7/1984 | Motsinger et al. | |
| 4,465,500 A | 8/1984 | Motsinger et al. | |
| 4,477,496 A | 10/1984 | Das et al. | |
| 4,546,880 A | 10/1985 | Reese | |
| 4,568,581 A | 2/1986 | Peoples, Jr. | |
| 4,751,134 A | 6/1988 | Chenoweth et al. | |
| 4,752,527 A | 6/1988 | Sanzero et al. | |
| 4,789,593 A | 12/1988 | Das | |
| 4,799,986 A | 1/1989 | Janni | |
| 4,812,186 A | 3/1989 | McConnell et al. | |
| 4,826,724 A | 5/1989 | Bainbridge et al. | |
| 4,840,755 A | 6/1989 | Nakazawa et al. | |
| 4,840,832 A | 6/1989 | Weinle et al. | |
| 4,851,283 A | 7/1989 | Holtrop et al. | |
| 4,888,235 A | 12/1989 | Chenoweth et al. | |
| 4,889,764 A | 12/1989 | Chenoweth et al. | |
| 4,946,738 A | 8/1990 | Chenoweth et al. | |

(Continued)

FOREIGN PATENT DOCUMENTS

| | | |
|---|---|---|
| EP | 148760 | 7/1985 |
| EP | 297500 | 1/1989 |

(Continued)

OTHER PUBLICATIONS

International Search Report dated Feb. 27, 2008 in PCT/US2007/18222.

(Continued)

*Primary Examiner* — Jeff Aftergut
(74) *Attorney, Agent, or Firm* — Calfee, Halter & Griswold LLP (57) ABSTRACT

A multilayer composite material is formed of an acoustic core layer and at least one outer strengthening layer. The acoustic composite material has desirable high strength and high flexural modulus properties.

31 Claims, 4 Drawing Sheets

(56) References Cited

U.S. PATENT DOCUMENTS

| | | |
|---|---|---|
| 4,948,661 A | 8/1990 | Smith et al. |
| 4,981,754 A | 1/1991 | Hsu |
| 5,000,807 A | 3/1991 | Stuart |
| 5,055,341 A | 10/1991 | Yamaji et al. |
| 5,068,001 A | 11/1991 | Haussling |
| 5,133,835 A | 7/1992 | Goettmann et al. |
| 5,154,798 A | 10/1992 | Melacini et al. |
| 5,205,018 A | 4/1993 | Leifeld et al. |
| 5,272,000 A | 12/1993 | Chenoweth et al. |
| 5,286,929 A | 2/1994 | Kazama et al. |
| 5,337,455 A | 8/1994 | Pinto et al. |
| 5,355,567 A | 10/1994 | Holliday |
| 5,378,528 A | 1/1995 | Makoui |
| 5,492,580 A | 2/1996 | Frank |
| 5,547,743 A | 8/1996 | Rumiesz, Jr. et al. |
| 5,554,831 A | 9/1996 | Matsukawa et al. |
| 5,565,049 A | 10/1996 | Simmons et al. |
| 5,571,610 A | 11/1996 | Loftus et al. |
| 5,584,950 A | 12/1996 | Gaffigan |
| 5,591,289 A | 1/1997 | Souders et al. |
| 5,614,132 A | 3/1997 | Bakhshi et al. |
| 5,632,949 A | 5/1997 | Fisher et al. |
| 5,662,981 A | 9/1997 | Olinger et al. |
| 5,693,378 A | 12/1997 | Hill et al. |
| 5,721,177 A | 2/1998 | Frank |
| 5,736,475 A | 4/1998 | Bakhshi et al. |
| 5,804,313 A | 9/1998 | Schell |
| 5,817,408 A | 10/1998 | Orimo et al. |
| 5,841,081 A | 11/1998 | Thompson et al. |
| 5,851,355 A | 12/1998 | Goetmann |
| 5,876,529 A | 3/1999 | Grant et al. |
| 5,945,643 A | 8/1999 | Casser |
| RE36,323 E | 10/1999 | Thompson et al. |
| 5,965,851 A | 10/1999 | Herreman et al. |
| 5,976,295 A | 11/1999 | Ang |
| 6,054,022 A | 4/2000 | Helwig et al. |
| 6,077,613 A | 6/2000 | Gaffigan |
| 6,103,155 A | 8/2000 | Uchida |
| 6,123,882 A | 9/2000 | Uchida |
| 6,148,641 A | 11/2000 | Blough et al. |
| 6,156,682 A | 12/2000 | Fletemier et al. |
| 6,159,882 A | 12/2000 | Kean et al. |
| 6,165,921 A | 12/2000 | Nagata et al. |
| 6,268,047 B1 | 7/2001 | Mulder et al. |
| 6,291,552 B1 | 9/2001 | Dong |
| 6,312,542 B1 | 11/2001 | Nagata et al. |
| 6,345,688 B1 | 2/2002 | Veen et al. |
| 6,364,976 B2 | 4/2002 | Fletemier et al. |
| 6,365,090 B1 | 4/2002 | Strait et al. |
| 6,497,787 B1 | 12/2002 | Geel |
| 6,572,723 B1 | 6/2003 | Tilton et al. |
| 6,669,265 B2 | 12/2003 | Tilton et al. |
| 6,695,939 B1 | 2/2004 | Nakamura et al. |
| 6,713,167 B2 | 3/2004 | Di Sante et al. |
| 6,756,332 B2 | 6/2004 | Sandoe et al. |
| 6,905,563 B2 | 6/2005 | Dong |
| 7,000,729 B2 | 2/2006 | Jacobsen |
| 7,138,023 B2 | 11/2006 | Haque et al. |
| 7,294,218 B2 | 11/2007 | Haque |
| 2002/0117352 A1 | 8/2002 | Veen et al. |
| 2002/0134616 A1 | 9/2002 | Sheperd |
| 2002/0160682 A1 | 10/2002 | Zeng et al. |
| 2003/0000663 A1 | 1/2003 | Geel |
| 2003/0003835 A1 | 1/2003 | Tilton et al. |
| 2003/0008592 A1 | 1/2003 | Block et al. |
| 2003/0044566 A1 | 3/2003 | Yang et al. |
| 2003/0055206 A1 | 3/2003 | Haile et al. |
| 2003/0060113 A1 | 3/2003 | Christie et al. |
| 2003/0121989 A1 | 7/2003 | Michael |
| 2003/0124314 A1* | 7/2003 | Michael et al. ............... 428/156 |
| 2003/0124940 A1 | 7/2003 | Michael |
| 2003/0134556 A1 | 7/2003 | Christie et al. |
| 2003/0176131 A1 | 9/2003 | Tilton |
| 2003/0194933 A1 | 10/2003 | Patel |
| 2004/0023586 A1 | 2/2004 | Tilton |
| 2004/0051212 A1 | 3/2004 | Michael |
| 2004/0065507 A1 | 4/2004 | Jacobsen |
| 2004/0161993 A1 | 8/2004 | Tripp et al. |
| 2004/0217507 A1 | 11/2004 | Yang et al. |
| 2005/0082721 A1 | 4/2005 | Haque et al. |
| 2005/0115662 A1* | 6/2005 | Haque et al. ............... 156/148 |
| 2005/0266757 A1 | 12/2005 | Roekens et al. |
| 2006/0014462 A1 | 1/2006 | Jones |
| 2006/0019569 A1 | 1/2006 | Lin |
| 2006/0137798 A1 | 6/2006 | Haque |
| 2006/0137799 A1 | 6/2006 | Haque et al. |
| 2006/0141260 A1 | 6/2006 | Haque et al. |
| 2006/0141884 A1 | 6/2006 | Haque |
| 2008/0050571 A1 | 2/2008 | Haque |
| 2008/0251187 A1 | 10/2008 | Haque et al. |
| 2011/0121482 A1 | 5/2011 | Roekens |

FOREIGN PATENT DOCUMENTS

| | | |
|---|---|---|
| EP | 774343 | 5/1997 |
| EP | 1 300 511 | 4/2003 |
| EP | 1418257 | 5/2004 |
| EP | 629651 | 12/2004 |
| FR | 2826359 | 12/2002 |
| GB | 1200342 | 7/1970 |
| GB | 1424682 | 2/1976 |
| JP | S48-064270 | 8/1973 |
| JP | H01-381045 | 4/1981 |
| JP | 58120530 | 7/1983 |
| JP | 58140346 | 8/1983 |
| JP | 63-75185 | 4/1988 |
| JP | 64-085400 | 3/1989 |
| JP | H01-503472 | 11/1989 |
| JP | H01-299828 | 12/1989 |
| JP | 7-242755 | 9/1995 |
| JP | 7-277778 | 10/1995 |
| JP | 408072108 | 3/1996 |
| JP | 11-060289 | 3/1999 |
| JP | 2000008260 | 1/2000 |
| JP | 2001-524612 | 12/2001 |
| JP | 2004-501803 | 1/2004 |
| JP | 2007-508964 | 4/2007 |
| JP | 2007-523270 | 8/2007 |
| WO | 01/31131 | 5/2001 |
| WO | 02/60702 | 8/2002 |
| WO | 02/62563 | 8/2002 |
| WO | 02/98643 | 12/2002 |
| WO | 03/057534 | 7/2003 |
| WO | 03/058600 | 7/2003 |
| WO | 03/078714 | 9/2003 |
| WO | WO 2005-037897 | 4/2005 |
| WO | 2005/080659 | 9/2005 |
| WO | WO 2006/055728 | 5/2006 |
| WO | 2006/071518 | 7/2006 |
| WO | WO 2006/071463 | 7/2006 |
| WO | 2007/008661 | 1/2007 |
| WO | 2008/027207 | 3/2008 |

OTHER PUBLICATIONS

Office action from Mexican Application No. 07/05904 dated Jan. 6, 2012 with English explanation of relevant portions of action.
Office action from U.S. Appl. No. 11/897,409 dated Dec. 5, 2012.
Office action from Japanese Application No. 2006-535638 dated Apr. 11, 2011.
Office action from Japanese Application No. 2007-543246 dated Jul. 25, 2011.
Office action from Japanese Application No. 2007-549396 dated Aug. 29, 2011.
Office action from Japanese Application No. 2007-549416 dated Aug. 29, 2011.
Office action from Mexican Application No. 09/01792 dated Mar. 29, 2011.
Enquireply archives, May 1999, Week 5 (#269) p. 1 of 1; peach.ease. lsoft.com: The Electronic Commerce Korea (EC Korea) HarmonizeddCode: 70/7020 Glass & Glassware.
Tiankuang, "Study on the control of the uniformity of chopped strand mat", Glass Fibers, No. 5, pp. 25-27, Dec. 31, 1996.

(56) References Cited

OTHER PUBLICATIONS

Office action from Mexican Application No. 08/000477 dated Nov. 7, 2011 with English explanation of relevant portions of action.
Office action from Mexican Application No. 09/01792 dated Oct. 7, 2011 with English explanation of relevant portions of action.
Office action from Canadian Application No. 2,585,913 dated Apr. 12, 2012.
Office action from Canadian Application No. 2,613,972 dated Jun. 15, 2012.
Notice of Allowance and Interview Summary from U.S. Appl. No. 10/688,013 dated Jul. 3, 2006.
Office action from U.S. Appl. No. 10/992,386 dated Apr. 30, 2007.
Notice of Allowance from U.S. Appl. No. 10/992,386 dated Jul. 16, 2007.
Office action from U.S. Appl. No. 11/027,925 dated May 31, 2007.
Office action from U.S. Appl. No. 11/027,925 dated Nov. 2, 2007.
Advisory Action from U.S. Appl. No. 11/027,925 dated Dec. 21, 2007.
Advisory Action from U.S. Appl. No. 11/027,925 dated Mar. 17, 2008.
Office action from U.S. Appl. No. 11/027,925 dated Jul. 1, 2008.
Office action from U.S. Appl. No. 11/027,925 dated Dec. 12, 2008.
Advisory Action from U.S. Appl. No. 11/027,925 dated Feb. 24, 2009.
Office action from U.S. Appl. No. 11/027,925 dated Apr. 2, 2009.
Office action from U.S. Appl. No. 11/027,925 dated Nov. 17, 2009.
Office action from U.S. Appl. No. 11/027,925 dated Apr. 28, 2010.
Office action from U.S. Appl. No. 11/027,925 dated Nov. 18, 2010.
Office action from U.S. Appl. No. 11/178,769 dated Sep. 20, 2007.
Office action from U.S. Appl. No. 11/178,769 dated Jan. 29, 2008.
Advisory Action from U.S. Appl. No. 11/178,769 dated Mar. 28, 2008.
Office action from U.S. Appl. No. 11/178,769 dated Jul. 3, 2008.
Office action from U.S. Appl. No. 11/178,769 dated Jan. 14, 2009.
Advisory Action from U.S. Appl. No. 11/178,769 dated Mar. 18, 2009.
Office action from U.S. Appl. No. 11/178,769 dated Jun. 3, 2009.
Office action from U.S. Appl. No. 11/178,769 dated Dec. 16, 2009.
Notice of Panel Decision from U.S. Appl. No. 11/178,769 dted Mar. 5, 2010.
Examiners Answer from U.S. Appl. No. 11/178,769 dated Aug. 3, 2010.
Board of Patent Appeals Docketing Notice from U.S. Appl. No. 11/178,769 dated Nov. 23, 2010.
Office action from U.S. Appl. No. 11/897,409 dated Oct. 1, 2009.
Office action from U.S. Appl. No. 11/897,409 dated Mar. 24, 2010.
Notice of Allowance from U.S. Appl. No. 11/897,409 dated Sep. 20, 2010.
Office action from U.S. Appl. No. 11/906,460 dated Aug. 6, 2010.
International Search Report from PCT/US05/45057 dated Apr. 28, 2006.
International Search Report from PCT/US06/26517 dated May 31, 2007.
Office action from Australian Application No. 20005322396 dated Jul. 26, 2010.
Office action from Australian Application No. 2005269298 dated Nov. 30, 2010.
Office action from Australian Application No. 2006269298 dated Nov. 30, 2010.
Office action from Chinese Application No. 200480030393.5 dated Aug. 24, 2007.
Office action from Chinese Application No. 200480030393.5 dated Jun. 6, 2008.
Office action from Chinese Application No. 200480030393.5 dated Jun. 16, 2009.
Office action from Chinese Application No. 200580047204.X dated Jan. 29, 2010.
Office action from Chinese Application No. 200580047204.X dated Oct. 28, 2010.
Office action from Chinese Application No. 200580039544.8 dated Jan. 8, 2010.
Office action from Chinese Application No. 200680025454.8 dated Nov. 9, 2010.
Communication from European Application No. 04795057.1 dated Jan. 4, 2007.
Communication from European Application No. 04795057.1 dated Aug. 6, 2008.
Communication from European Application No. 04795057.1 dated Nov. 4, 2010.
Communication from European Application No. 04795057.1 dated Nov. 26, 2010.
Office action from European Application No. 05851765.7 dated Jan. 16, 2008.
Office action from Indian Application No. 842/KOLNP/2006 dated Mar. 4, 2008.
Office action from Indian Application No. 2290/KOLNP/2007 dated Mar. 21, 2011.
Office action from Japanese Application No. 2006-535638 dated Mar. 4, 2010.
Office Action from Canadian Application No. 2,661,279 dated Nov. 15, 2013.

* cited by examiner

| Table 1 | | | | | |
|---|---|---|---|---|---|
| "A" Amax 1400 g/m² + (2 GMat x 200 g/m²) Total: 1800 g/m² | | "B" Amax 1400 g/m² + (2 GMat x 100 g/m²) Total: 1600 g/m² | | "C" Amax 1200 g/m² + (2 GMat x 200 g/m²) Total: 1600 g/m² | |
| MD | TD | MD | TD | MD | TD |
| 43.43 | 38.38 | 33.20 | 35.93 | 36.53 | 31.54 |
| 43.58 | 32.25 | 31.47 | 26.88 | 27.61 | 29.24 |
| 51.44 | 33.69 | 34.81 | 30.90 | 39.07 | 38.26 |
| 52.08 | 45.41 | 47.06 | 26.35 | 39.82 | 24.39 |
| 47.63 | 37.43 | 36.64 | 30.02 | 35.76 | 30.86 |
| 42.53 | | 33.33 | | 33.31 | |
| "D" Amax 1200 g/m² + (2 GMat x 100 g/m²) Total: 1400 g/m² | | "E" Amax 1000 g/m² + (2 GMat x 200 g/m²) Total: 1400 g/m² | | "F" Amax 1000 g/m² + (2 GMat x 100 g/m²) Total: 1200 g/m² | |
| 28.76 | 24.87 | 22.7 | 20.44 | 28.76 | 24.87 |
| 36.53 | 24.45 | 19.12 | 21.45 | 36.53 | 24.45 |
| 32.14 | 23.96 | 21.04 | 16.44 | 32.14 | 23.96 |
| 27.14 | 34.55 | 20.33 | 20.17 | 27.14 | 34.55 |
| 31.14 | 26.96 | 20.80 | 19.63 | 31.14 | 26.96 |
| 27.46 | | 29.05 | | 20.21 | |
| AMax Stiffness (N/mm) Molded @ 5mm | | | | | |
| Compar. #1 1000 g/m² | | Compar. #2 1200 g/m² | | Compar. #3 1400 g/m² | |
| MD | TD | MD | TD | MD | TD |
| 16.9 | 13.47 | 23.54 | 11.37 | 24.06 | 18.45 |
| 14.82 | 12.19 | 20.16 | 5.46 | 21.06 | 23.50 |
| 21.41 | 16.47 | 23.55 | 13.3 | 23.77 | 14.50 |
| 12.07 | 16.58 | 19.03 | 15.08 | 22.67 | 13.85 |
| 14.4 | 17.7 | 12.12 | 17.78 | 13.32 | 18.05 |
| 16.94 | 19.59 | 20.97 | 18.33 | 18.50 | 18.26 |
| 22.95 | 15.57 | 15.5 | 14.96 | 24.66 | 14.14 |
| 23.34 | 14.09 | 12.89 | 13.67 | 23.79 | 14.66 |
| 17.85 | 15.71 | 18.47 | 13.74 | 21.48 | 16.93 |
| 16.78 | | 16.11 | | 19.20 | |

FIG. 4

REINFORCED ACOUSTICAL MATERIAL HAVING HIGH STRENGTH, HIGH MODULUS PROPERTIES

TECHNICAL FIELD AND INDUSTRIAL APPLICABILITY OF THE INVENTION

The present invention relates generally to acoustical products, and more particularly, to a high strength, high modulus acoustic composite material.

BACKGROUND OF THE INVENTION

Sound insulation materials are used in a variety of settings where it is desired to dampen noise from an external source. For example, sound insulation materials have been used in applications such as in appliances to reduce the sound emitted into the surrounding areas of a home, in automobiles to reduce mechanical sounds of the motor and road noise, and in office buildings to attenuate sound generated from the workplace, such as from telephone conversations or from the operation of office equipment. In automobiles, the insulation material also relies upon thermal shielding properties to reduce or prevent the transmission of heat from various heat sources in the automobile (e.g., engine, transmission, exhaust, etc.) to the passenger compartment of the vehicle. Acoustical insulation typically relies upon both sound absorption (i.e., the ability to absorb incident sound waves) and transmission loss (i.e., the ability to reflect incident sound waves) to provide adequate sound attenuation.

Conventional acoustical insulation materials include materials such as foams, compressed fibers, fiberglass batts, felts, and nonwoven webs of fibers such as meltblown fibers. Although there are numerous acoustical insulation products in existence in the art, there is still a need for insulation products that have sufficient structural properties so that the insulation products can be employed in end-use applications that require high strength, high modulus insulation materials.

There is also a need for acoustical insulation materials that exhibit superior sound attenuating properties, improved structural and thermal properties, and that are lightweight and low in cost.

The invention will be more readily understood from the following descriptions thereof given, by way of example, with reference to the accompanying drawings.

SUMMARY OF THE INVENTION

The multilayer composite material is formed of a core acoustical composite layer and at least one outer strengthening layer. The acoustic composite material has desirable high strength and high flexural modulus properties.

A method of forming an acoustic composite material includes the steps of: positioning a core layer next to a major surface of at least one outer strengthening layer, the core layer being formed of a composite material comprising dehydrated reinforcing fibers and organic fibers, and bonding the core layer to the outer strengthening layer to form an acoustic composite material.

The method can further include the step of forming the acoustic core layer prior to the positioning step. The forming step can include: removing water from wet reinforcing fibers to form dehydrated reinforcing fibers; blending the dehydrated reinforcing fibers with the organic fibers to form a substantially homogenous mixture of the dehydrated reinforcing fibers and the organic fibers; and forming the mixture into the acoustic core layer. The outer strengthening layer can comprise a chopped strand mat.

The acoustic composite material has a core layer next to a major surface of at least one outer strengthening layer where the core layer is formed of a composite material comprising dehydrated reinforcing fibers and organic fibers.

In one embodiment, the fibrous material forming the core acoustical composite layer includes polymer based thermoplastic materials such as polyester and polypropylene and reinforcing fibers such as glass fibers. The fibrous material may contain from 40-60% glass fibers, by wt.

In certain embodiments, the reinforcing fibers in the core acoustic layer are wet use chopped strand glass fibers. Wet reinforcing fibers are typically agglomerated in the form of a bale, package, or bundle of individual glass fibers. To form the core acoustical composite layer, wet reinforcing fibers are opened and at least a portion of the water present in the wet reinforcing fibers is removed.

In addition, wet use chopped strand glass fibers are less expensive to manufacture than dry chopped fibers because dry fibers are typically dried and packaged in separate steps before being chopped. Therefore, the use of wet use chopped strand glass fibers allows composite products to be manufactured at lower costs.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. The terms "top", "bottom", "side", and the like are used herein for the purpose of explanation only. It will be understood that when an element such as a layer, region, or panel is referred to as being "on" another element, it can be directly on the other element or intervening elements may be present. If an element or layer is described as being "adjacent to" or "against" another element or layer, it is to be appreciated that that element or layer may be directly adjacent to or directly against that other element or layer, or intervening elements may be present. It will also be understood that when an element such as a layer or element is referred to as being "over" another element, it can be directly over the other element, or intervening elements may be present.

Figure 3:
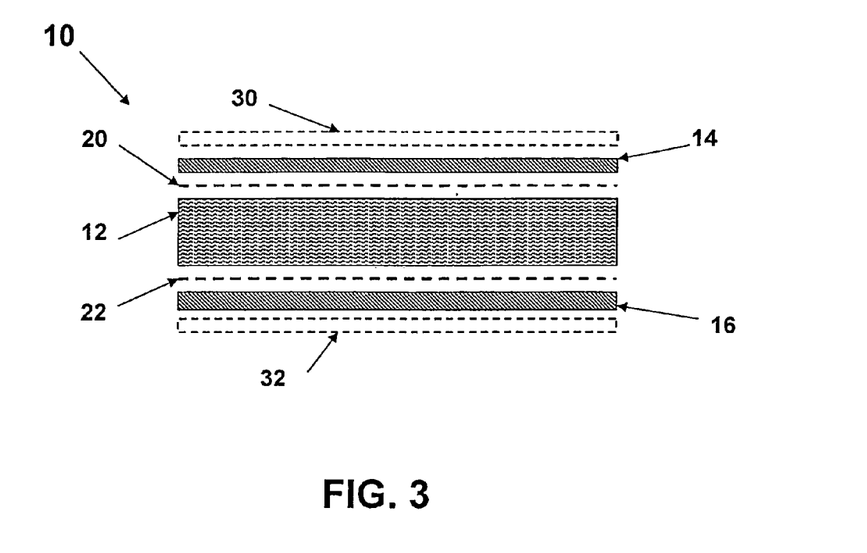
FIG. 3 is a schematic illustration of an acoustic composite material.

Referring initially to FIG. 3, a multilayer acoustic material 10 is schematically illustrated as having an acoustic core layer 12 that includes reinforcing fibers and organic fibers, and at least one outer strengthening layer 14. For ease of illustration, the multilayer acoustic material 10 is shown as having two opposing outer strengthening layers 14 and 16; however, it is to be understood that the multilayer acoustic composite material 10 can have one outer strengthening layer. One or more types of fiberglass materials may be used to form the first and second outer strengthening layers 14 and 16. The fibers forming the first and second outer strengthening layers 14 and 16 may have the same or different lengths and/or diameters. For example, the first and second strengthening layers 14, 16 may be formed of a single glass fibrous material in which the fibers have different lengths and/or diameters.

In certain embodiments, the acoustic composite material 10 may include an adhesive material 20 positioned between the first outer strengthening layer 14 and the acoustic core layer 12 and a second adhesive material 20 positioned between the acoustic core layer 12 and the second outer strengthening layer 16. In certain embodiments, the adhesive materials 20, 22 can be, for example, a spunbonded adhesive or a PTFE sheet.

In certain embodiments, the acoustic composite material 10 may include one or more surface coverings 30, 32 bonded to an exposed major surface on one or both of the first and second outer layers 14, 16. The surface coverings 30, 32 may be formed of fabrics, wall paper, vinyl, leather, aluminum foil, thin copper sheets, thermoplastic olefins (TPO), or films having various constructions, including monolayer films such as polypropylene, polyethylene, and polyamide, or multilayer films such as ethylene/acrylic acid (EAA), ethylene vinyl acetate (EVA), and polypropylene/polyamide (PP/PA). The surface coverings 30, 32 may assist in altering the acoustical properties of the acoustic composite material 10 so that it can be tuned to meet the needs of a particular application. In addition, depending on the material of the surface layers, the surface layers may provide other properties of the acoustic composite material such as, but not limited to, water permeability or non-permeability, abrasion resistance, and/or heat resistance.

It is to be understood that the nomenclature for the acoustic core layer 12 and the first and second strengthening layers 14, 16 are used for ease of discussion herein and that outer strengthening layers 14, 16 may also provide acoustical properties.

Figure 2:
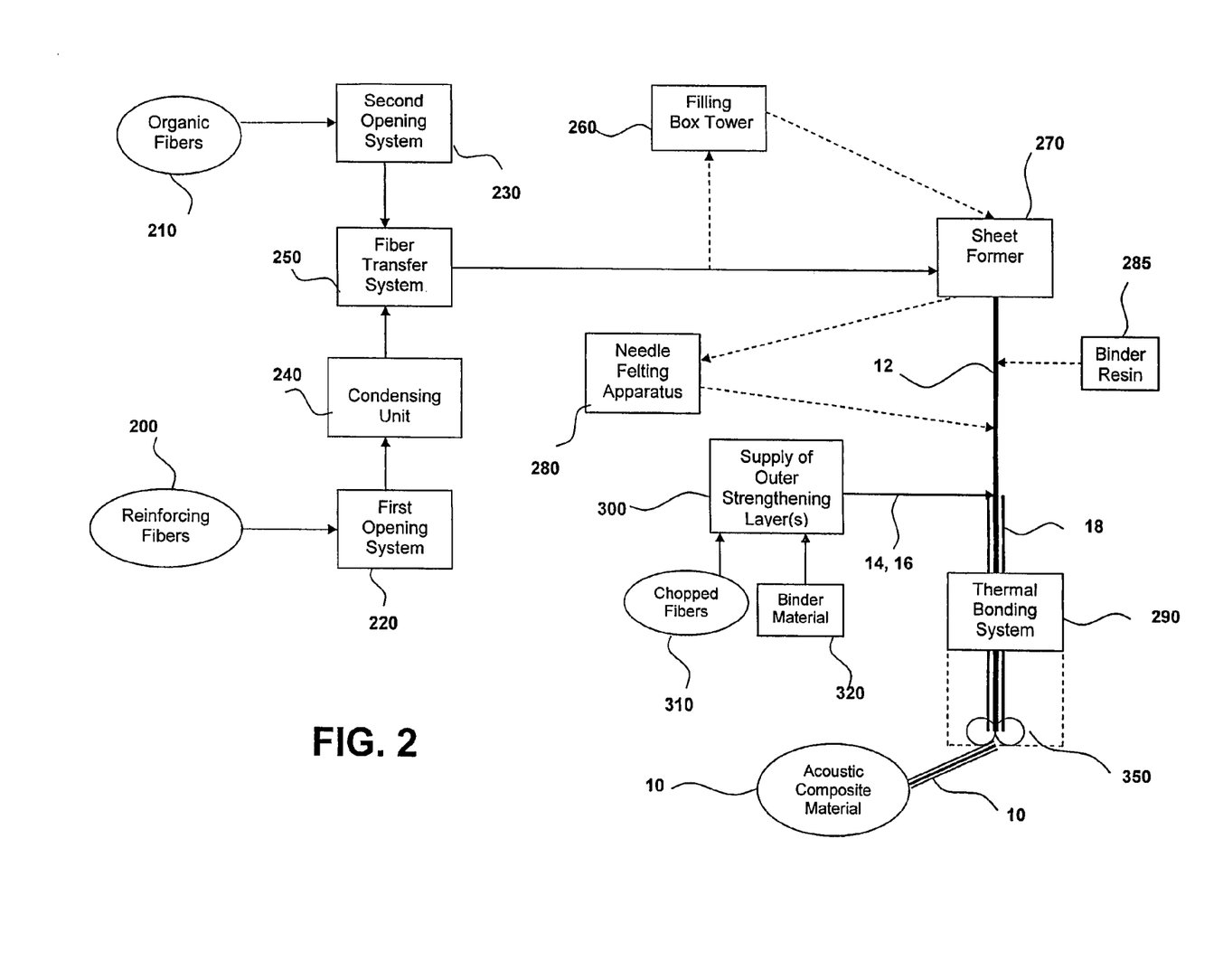
FIG. 2 is a schematic illustration showing an air-laid process using wet reinforcing fibers to form an acoustic core layer, in combination with a process for making an acoustic material having an acoustic core layer and at least one outer strengthening layer.

As schematically illustrated in FIG. 2, the outer strengthening layers 14, 16 are comprised of randomly oriented chopped glass fiber strands 310 that are bonded together with a thermoplastic or thermoset binder material 320. The outer strengthening layers 14, 16 are fed from a supply 300. such as a roller or reel. While not shown, the binder material 320 is commonly applied in a powdered form and the mat having binder material 320 applied is then taken through a curing process. During the curing process the chopped fibers 310 are bonded together where they intersect to form a mat with a certain amount of structural rigidity.

Also as schematically illustrated in FIG. 2, the acoustic core layer 12 is comprised of reinforcing fibers 200 and organic fibers 210.

The reinforcing fibers 200 used in the composite material 10 may be any type of organic or inorganic fiber suitable for providing good structural qualities as well as good acoustical and thermal properties. Non-limiting examples of reinforcing fibers that may be used in the composite material include glass fibers, wool glass fibers, natural fibers, cellulosic fibers, metal fibers, ceramic fibers, mineral fibers, carbon fibers, graphite fibers, nanofibers, or combinations thereof. The term "natural fiber" as used herein refers to plant fibers extracted from any part of a plant, including, but not limited to, the stem, seeds, leaves, roots, or bast. In the composite material, the reinforcing fibers may have the same or different lengths, diameters, and/or denier. In one embodiment, the reinforcing fibers are glass fibers, although other fibers can be used.

The reinforcing fibers 200 used in the acoustic core layer 12 may have a length of from approximately about 5 to about 100 mm, and even in certain embodiments, a length of from about 10 to about 50 mm. Additionally, the reinforcing fibers may have diameters of from about 8 to about 25 microns, and can have diameters of from about 12 to about 18 microns. The reinforcing fibers may have varying lengths, aspect ratios and diameters relative to each other within the composite material. The reinforcing fibers may be present in an amount of from about 20 to about 80% by weight of the total fibers, and, in certain embodiments, are present in an amount of from about 40 to about 60% by weight.

The organic fibers 210 present in the acoustic core layer 12 may include one or more of polymer based thermoplastic fibers such as, but not limited to, polyester fibers, polyethylene fibers, polypropylene fibers, polyethylene terephthalate (PET) fibers, polyphenylene sulfide (PPS) fibers, polyvinyl chloride (PVC) fibers, ethylene vinyl acetate/vinyl chloride (EVA/VC) fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon, and nylon. The organic fibers may be functionalized with acidic groups, for example, by carboxylating with an acid such as a maleated acid or an acrylic acid, or the organic fibers may be functionalized by adding an anhydride group or vinyl acetate. The organic fibers may alternatively be in the form of a flake, granule, or a powder rather than in the form of a polymer fiber. In some embodiments, a resin in the form of a flake, granule, and/or a powder is added in addition to the organic fibers.

One or more types of organic fibers 210 may be present in the acoustic core layer 12. The organic fibers may have the same or varying lengths, diameters, and/or denier within the composite material. The acoustical behavior, stiffness, load deflection, and strength of the composite material may be tuned by altering the lengths and/or denier of the organic fibers. In addition, the ratio of the different organic fibers present in the composite material can be varied to achieve specific mechanical, acoustic, and thermal properties.

The organic fibers 210 may have a length of from approximately 10 to about 100 mm, and can have a length of from about 10 to about 50 mm. Additionally, the organic fibers may have a denier of from about 2 to about 25 denier, and in certain embodiments, from about 2 to about 12 denier. The polymer fibers may be present in the composite material in an amount of from about 20 to about 80% by weight of the total fibers, and, in certain embodiments, are present in an amount of from about 40 to about 60% by weight.

One or more of the organic fibers 210 may be multicomponent fibers such as bicomponent polymer fibers, tricomponent fibers, or plastic-coated mineral fibers such as thermoplastic coated glass fibers. The bicomponent fibers may be arranged in a sheath-core, side-by-side, islands-in-the-sea, or segmented-pie arrangement. In certain embodiments, the bicomponent fibers are formed in a sheath-core arrangement in which the sheath is formed of first polymer fibers that substantially surrounds the core formed of second polymer fibers. It is not required that the sheath fibers totally surround the core fibers. The first polymer fibers have a melting point lower than the melting point of the second polymer fibers so that upon heating the bicomponent fibers, the first and second polymer fibers react differently. In particular, when the bicomponent fibers are heated to a temperature that is above the melting point of the first polymer fibers (sheath fibers) and below the melting point of the second polymer fibers (core fibers), the first polymer fibers will soften or melt while the second polymer fibers remain intact. This softening of the first polymer fibers (sheath fibers) will cause the first polymer fibers to become sticky and bond the first polymer fibers to themselves and other fibers that may be in close proximity.

Numerous combinations of materials can be used to make the bicomponent polymer fibers, such as, but not limited to, combinations using polyester, polypropylene, polysulfide, polyolefin, and polyethylene fibers. Specific polymer combinations for the bicomponent fibers include polyethylene terephthalate/polypropylene, polyethylene terephthalate/polyethylene, and polypropylene/polyethylene. Other non-limiting bicomponent fiber examples include copolyester polyethylene terephthalate/polyethylene terephthalate (co-PET/PET), poly 1,4 cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET).

The bicomponent polymer fibers may have a denier from about 1-18 denier and a length of from about 2 to about 4 mm. In certain embodiments, the first polymer fibers (sheath fibers) have a melting point within the range of from about 150 to about 400° F., and in certain embodiments, within the range of from about 170 to about 10° F. The second polymer fibers (core fibers) have a higher melting point, and, in certain embodiments, above about 350° F. Bicomponent fibers may be used as a component of the composite material or they may be used as the organic fibers present in the composite material.

The acoustic core layer 12 may be formed of an air-laid, wet-laid, or meltblown non-woven mat or web of randomly oriented reinforcing fibers and organic fibers. In at least one exemplary embodiment, the acoustic core layer 12 is formed by a dry-laid process, such as the dry-laid process described in U.S. patent application Ser. No. 10/688,013, filed on Oct. 17, 2003, to Enamul Haque entitled "Development Of Thermoplastic Composites Using Wet Use Chopped Strand Glass In A Dry Laid Process", which is expressly incorporated herein by reference in its entirety. In certain embodiments, the reinforcing fibers used to form the acoustic core layer 12 are wet reinforcing fibers, and may be wet use chopped strand glass fibers. Wet use chopped strand glass fibers for use as the reinforcing fibers may be formed by conventional processes known in the art. It is desirable that the wet use chopped strand glass fibers have a moisture content of from about 5 to about 30%, and can have a moisture content of from about 5 to about 15%.

The use of wet use chopped strand glass fibers as the reinforcing fibers 200 provides a cost advantage over conventional dry-laid glass processes. For example, wet use chopped strand glass fibers are less expensive to manufacture than dry chopped fibers such as dry use chopped strand glass fibers (DUCS) because dry fibers are typically dried and packaged in separate steps before being chopped. As a result, the use of wet use chopped strand glass fibers allows the composite material and subsequent acoustic composite material to be manufactured with lower costs.

Figure 1:
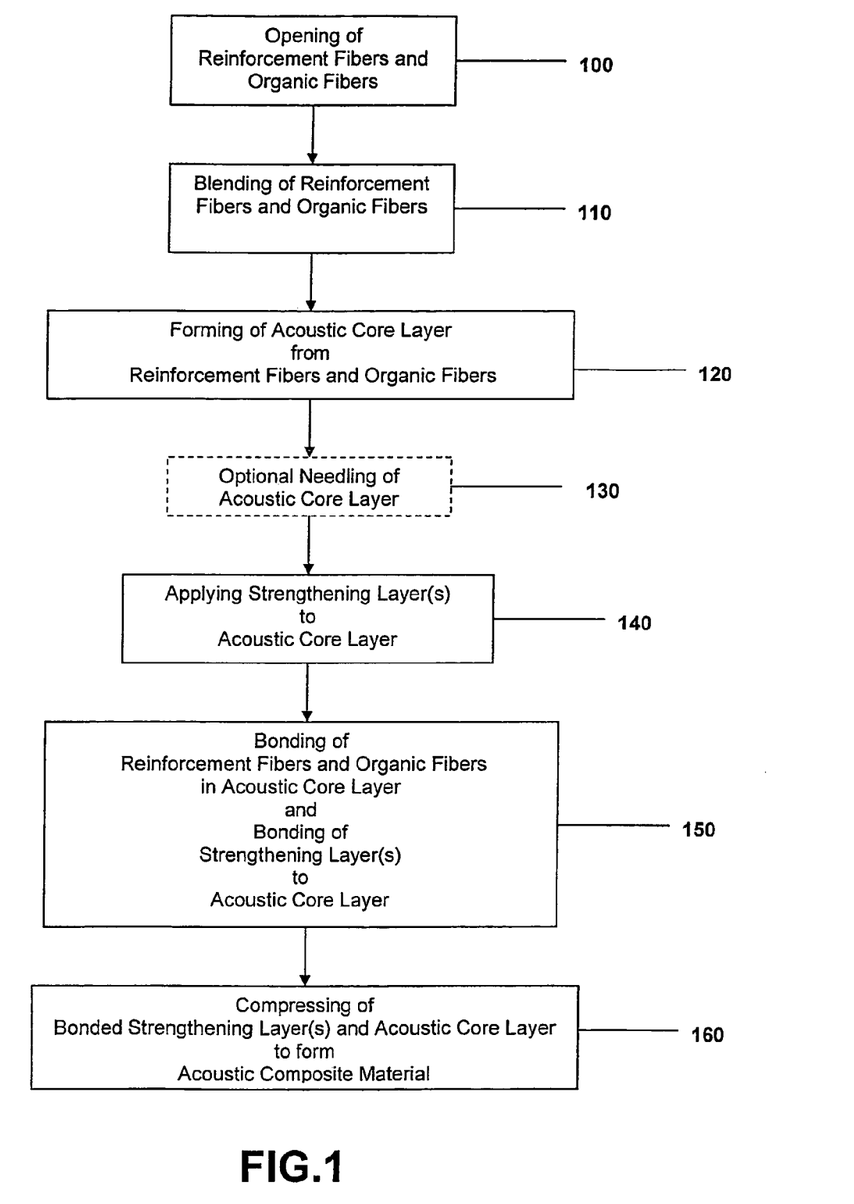
FIG. 1 is a flow diagram illustrating steps for making an acoustic composite material.

An exemplary process for forming a composite material 10 is generally illustrated in FIG. 1, and includes at least partially opening the reinforcing fibers and the organic fibers (step 100), blending together the reinforcing fibers and the organic fibers to form a substantially homogenous mixture of the dehydrated reinforcing fibers and the organic fibers (step 110), forming the blended mixture of the reinforcing fiber and the organic fibers into an acoustic core layer (step 120), optionally, needling the acoustic core layer (step 130), applying at least one outer strengthening layer to at least one major surface of the acoustic core layer (step 140), and bonding together:

i) the organic fibers to the reinforcing organic fibers in the acoustic core layer, and ii) the outer strengthening layer(s) to the acoustic core layer (step 150), and, in certain embodiments, compressing the acoustic core layer and the outer strengthening layers(s) (step 160).

The reinforcing fibers 200 and the organic fibers 210 are typically agglomerated in the form of bundles or strands of fibers or filaments. Wet glass or wet chop reinforcing fibers are typically packaged and shipped in the form of "boxes" of individual fibers. In forming the composite material, bales of reinforcing fibers and organic fibers may be opened by opening systems, such as a bale opening systems, which are common in the industry. The opening system serves both to decouple the clustered bundles or strands and to enhance fiber-to-fiber contact.

Turning now to FIG. 2, the opening of the reinforcing fibers 200 and organic fibers 210 can be seen. The reinforcing fibers 200 and the organic fibers 210, typically in the form of bales, are fed into a first opening system 220 and a second opening system 230, respectively, to at least partially open and/or filamentize (individualize) the wet reinforcing fibers 200 and organic fibers 210. Although the exemplary process depicted in FIGS. 1 and 2 show opening the organic fibers 210 by a second opening system 230, the organic fibers 210 may be fed directly into the fiber transfer system 250 (embodiment not illustrated) if the organic fibers 210 are present or obtained in a filamentized form, and are not in the form of a bale.

In alternate embodiments where the organic fibers 210 are in the form of a flake, granule, or powder (not illustrated) and not in a fibrous form, the second opening system 230 may be replaced with an apparatus suitable for distributing the flakes, powders, or granules to the fiber transfer system 250 so that these resinous materials may be mixed with the reinforcing fibers 200. A suitable distribution apparatus would be easily identified by those of skill in the art. In embodiments where a resin in the form of a flake, granule, or powder is used in addition to the organic fibers 210 (and not in place of), the apparatus distributing the flakes, granules, or powder may not need to replace the second opening system 230.

The first and second opening systems 220, 230 can be bale openers, but may be any type of opener suitable for opening the bales of wet reinforcing fibers 200 and organic fibers 210. The design of the openers depends on the type and physical characteristics of the fiber being opened. Suitable openers for use in the present invention include any conventional standard type bale openers with or without a weighing device. The weighing device serves to continuously weigh the partially opened fibers as they are passed through the bale opener to monitor the amount of fibers that are passed onto the next processing step. The bale openers may be equipped with various fine openers, one or more licker-in drums or sawtooth drums, feeding rollers, and/or or a combination of a feeding roller and a nose bar.

The partially opened wet reinforcing fibers 200 may then be dosed or fed from the first opening system 220 to a condensing unit 240 to remove water from the wet fibers. In exemplary embodiments, greater than about 70% of the free water (water that is external to the reinforcing fibers) is removed. In certain embodiments, however, substantially all of the water is removed by the condensing unit 240. It should be noted that the phrase "substantially all of the water" as it is used herein is meant to denote that all or nearly all of the free water is removed. The condensing unit 240 may be any drying or water removal device, many of which are known in the art, such as, but not limited to, an air dryer, an oven, rollers, a suction pump, a heated drum dryer, an infrared heating source, a hot air blower, or a microwave emitting source.

After the reinforcing fibers 200 have passed through the condensing unit 240, the fibers may be passed through another opening system, such as a bale opener as is described above, to further filamentize and separate the reinforcing fibers 200 (embodiment not shown).

The reinforcing fibers 200 and the organic fibers 210 may be blended together by a fiber transfer system 250. In certain embodiments, the reinforcing fibers 200 and the organic fibers 210 are blended in a high velocity air stream. The fiber transfer system 250 serves both as a conduit to transport the reinforcing fibers 200 and the organic fibers 210 to a sheet former 270 and to substantially uniformly mix the reinforcing fibers 200 and organic fibers 210. It is desirable to distribute the reinforcing fibers 200 and the organic fibers 210 as uniformly as possible.

The ratio of reinforcing fibers 200 to organic fibers 210 entering the fiber transfer system 250 may be controlled by a weighing device such as described above with respect to the first and second opening systems 220, 230 or by the amount and/or speed at which the fibers are passed through the first and second opening systems 220, 230. In certain embodiments, the ratio of reinforcing fibers 200 to organic fibers 210 present in the air stream is 50:50. However, it is to be appreciated that the ratio of fibers present within the air stream will vary depending on the desired structural and acoustical requirements of the final product.

In some embodiments of the invention, other types of fibers such as chopped roving, dry use chopped strand glass (DUCS), natural fibers (such as jute, hemp, and kenaf), aramid fibers, metal fibers, ceramic fibers, mineral fibers, carbon fibers, graphite fibers, polymer fibers, or combinations thereof may be opened and filamentized by additional openers (not shown), added to the fiber transport system 250, and mixed with the reinforcing fibers 200 and organic fibers 210, depending on the desired composition of the composite material. When such additional fibers are added, up to approximately 25% of the fibers in the fiber transfer system 250 consist of these additional fibers.

The mixture of reinforcing fibers 200 and organic fibers 210 exiting the fiber transfer system 250 may be transferred to a sheet former 270 where the blended fibers are formed into the acoustic core layer 12. The blended fibers may be transported by the fiber transfer system 250 to a filling box tower 260 where the reinforcing fibers 200 and organic fibers 210 are volumetrically fed into the sheet former 270, such as by a computer monitored electronic weighing apparatus, prior to entering the sheet former 270. The filling box tower 260 may be located internally in the sheet former 270 or it may be positioned external to the sheet former 270. The filling box tower 260 may also include baffles to further blend and mix the reinforcing fibers 200 and organic fibers 210 prior to entering the sheet former 270. In one exemplary embodiment (not shown), the mixture of reinforcing fibers 200 and organic fibers 210 are blown onto a drum or series of drums covered with fine wires or teeth to comb the fibers into parallel arrays prior to entering the sheet former 270 (not illustrated), as in a carding process.

In addition, the acoustic core layer 12 formed by the sheet former 270 may be transferred to a second sheet former (not shown). The second sheet former assists in distributing the reinforcing fibers 200 and organic fibers 210 in the acoustic core layer 12. The use of an additional sheet former may increase the structural integrity of the formed acoustic core layer 12.

In some embodiments, a sheet former 270 having a condenser and a distribution conveyor may be used to achieve a higher fiber feed into the filling box tower 260 and an increased volume of air through the filling box tower 260. In order to achieve an improved cross-distribution of the opened fibers, the distributor conveyor may run transversely to the direction of the acoustic core layer 12. As a result, the reinforcing fibers 200 and the organic fibers 210 may be transferred into the filling box tower 260 with little or no pressure and minimal fiber breakage.

In at least one exemplary embodiment, the lengths of the organic fibers 210 are substantially the same as lengths of the reinforcing fibers 200. The use of substantially similar lengths of the reinforcing and organic fibers 200, 210 assists in uniformly distributing the fibers during the mixing of the reinforcing fibers 200 and organic fibers 210 in the fiber transfer system 250, filling box tower 260, and sheet former 270.

The acoustic core layer 12 contains a substantially uniform distribution of reinforcing fibers 200 and organic fibers 210 at a desired ratio and weight distribution. The acoustic core layer 12 formed by the sheet former 270 may have a weight distribution of from 400-2500 $g/m^2$, and in certain embodiments, have a weight distribution of from about 800 to about 2000 $g/m^2$.

In one or more embodiments, the acoustic core layer 12 exiting the sheet former 270 may be subjected to a needling process in a needle felting apparatus 280 in which barbed or forked needles are pushed in a downward and/or upward motion through the fibers of the acoustic core layer 12 to entangle or intertwine the reinforcing fibers 200 and organic fibers 210 and impart mechanical strength and integrity to the acoustic core layer 12. The needle felting apparatus 280 may include a web feeding mechanism, a needle beam with a needleboard, barbed felting needles ranging in number from about 500 per meter to about 7,500 per meter of machine width, a stripper plate, a bed plate, and a take-up mechanism. Mechanical interlocking of the reinforcing fibers 200 and organic fibers 210 is achieved by passing the barbed felting needles repeatedly into and out of the acoustic core layer 12. An optimal needle selection for use with the particular reinforcing fibers 200 and organic fibers 210 chosen for use in the inventive process would be easily identified by one of skill in the art.

Either after the acoustic core layer 12 exits the sheet former 270 or after the optional needling of the acoustic core layer 12, the outer strengthening layers 14, 16 are fed from the supply 300 onto at least one major surface of the acoustic core layer 12 to form a multilayered intermediate 18.

The first and/or second outer strengthening layers 14, 16 are positioned on a major surface of the acoustical composite layer 12, and may be attached to the acoustical composite layer 12 such as by a nip-roll system or by using a laminator (not shown).

The multilayered intermediate 18 is passed through a thermal bonding system 290. During the bonding step, the reinforcing fibers 200 and organic fibers 210 of the acoustic core layer 12 are bonded together and the thermoplastic material of the outer strengthening layers 14, 16 are bonded to at least one of the reinforcing fibers 200 and the organic fibers 210 in the acoustic layer 12.

In the thermal bonding step, the thermoplastic properties of the organic fibers 210 are used to form bonds with the reinforcing fibers 200 upon heating. Also, in the thermal bonding system 290, the multilayered intermediate 18 is heated to a temperature that is above the melting point of the organic fibers 210 but below the melting point of the reinforcing fibers 200. When bicomponent fibers are used as the organic fibers 210, the temperature in the thermal bonding system 290 is raised to a temperature that is above the melting point of the sheath fibers, but below the melting point of the reinforcing fibers 200.

Heating the organic fibers 210 to a temperature above their melting point, or above the melting point of the sheath fibers in the instance where the organic fibers 210 are bicomponent fibers, causes the organic fibers 210 (or sheath fibers) to become adhesive and bond the organic fibers 210 and reinforcing fibers 200. If the organic fibers 210 completely melt, the melted fibers may encapsulate the reinforcing fibers 200. As long as the temperature within the thermal bonding system 290 is not raised as high as the melting point of the reinforcing fibers 200, these fibers will remain in a fibrous form within the thermal bonding system 290 and composite material 10.

Although the organic fibers 210 may be used to bond the reinforcing fibers 200 to each other, in certain embodiments, a thermoplastic or thermosetting binder resin 285 may be added to assist in the bonding of the fibers prior to passing the acoustic core layer 12 through the thermal bonding system 290. The binder resin 285 may be in the form of a resin powder, flake, granule, foam, or liquid spray. The binder resin 285 may be added to the acoustic core layer 12 by any suitable manner, such as, for example, a flood and extract method or by spraying the binder resin 285 onto the acoustic core layer 12. The amount of binder resin 285 added to the acoustic core layer 12 may be varied depending on the desired characteristics of the composite material 10. A catalyst such as ammonium chloride, p-toluene, sulfonic acid, aluminum sulfate, ammonium phosphate, or zinc nitrate may also be used to improve the rate of curing and the quality of the cured binder resin 285.

Simultaneously, the thermal bonding causes the binder material 320 in the outer strengthening layers 14, 16 to be heated to a temperature above its melting point and causes the outer strengthening layers 14, 16 to become adhesive and bond to the acoustic core layer 12.

The thermal bonding system 290 may include any known heating and bonding method known in the art, such as oven bonding, oven bonding using forced air, infrared heating, hot calendaring, belt calendaring, ultrasonic bonding, microwave heating, and heated drums. Optionally, two or more of these bonding methods may be used in combination to bond the fibers in the acoustic core layer 12 and the outer strengthening layers 14, 16 to the acoustic core layer 12. The temperature of the thermal bonding system 290 may vary depending on the melting point of the organic fibers 210 used and whether or not bicomponent fibers are present in the acoustic core layer 12.

Also, in certain embodiments, the acoustic material 10 passes through a compression system 350 to reduce the thickness of the acoustic core layer 12. In certain embodiments, the acoustic core layer 12 can be reduced from a thickness of about 3½ inches to about ¼ inches. In certain embodiments, the compression system can be incorporated into or be within the thermal bonding system 290, if desired.

The composite material 10 that emerges from the thermal bonding system 290 contains a uniform or nearly uniform distribution of organic fibers 210 and reinforcing fibers 200. The uniform or nearly uniform distribution of reinforcing fibers 200 and organic fibers 210 in the composite material 10 and the presence of the outer strengthening layers 14, 16 provides improved strength, improved modulus and improved acoustical properties to the acoustic composite material 10. In addition, the composite material 10 has substantially uniform weight consistency, which results in uniform properties such as flexural and impact strength in the acoustic composite material.

The physical properties of the acoustic composite material 10 such as strength, stiffness, and load distribution may be altered or tailored to meet specific requirements by altering the weight, K-value, thickness and/or type of foam or by the specific type of other core material used (such as balsa weight) in the core layer 12.

It is now possible to optimize the physical properties of the acoustic composite material 10 (strength, stiffness, and load deflection) by altering the amount and/or type of the chopped strands 310 and/or binder material 320 used in the outer strengthening layers 14, 16.

In addition, the strength, stiffness, and load deflection of the acoustic composite material 10 may be optimized by altering the weight of the reinforcing and/or organic fibers, by changing the reinforcing fiber content and/or length or diameter of the reinforcing fibers, or by altering the fiber length and/or denier of the organic fibers used in the acoustic core layer 12. Thus, the strength, stiffness, load deflection, and acoustic requirements (if any) of the acoustic composite material 10 may be altered or improved by the specific combination of fibers present in the acoustic composite material 10, and the acoustic composite material can therefore be tailored to meet the needs of a particular application.

The acoustic composite materials 10 may then be laminated, such as by using a laminator or other type of moving belt press. The acoustic composite material 10 may be compression molded or thermoformed into various shapes. The acoustic composite material 10 may be molded or die-cut to form a desired acoustical, semi-structural final part in a one step process. The process of manufacturing acoustic composite materials may be conducted either in-line (in a continuous manner), or in individual steps. In certain embodiments, the process is conducted in-line. Moreover, any additional process steps such as adding specialty films, scrims, and/or other fabrics are considered to be within the scope of the invention.

The multilayer acoustic composite material 10 is especially useful in a number of both structural and non-structural acoustical applications. Examples of non-structural applications include, for example, appliances, office screens and partitions, ceiling tiles, and building panels. Examples of structural applications include, for example, automobiles (e.g., headliners, hood liners, floor liners, trim panels, parcel shelves, sunshades, instrument panel structures, door inners, and the like), basement finishing systems, and wall panels and roof panels of recreational vehicles (RV's).

The thickness of the formed composite product, porosity of the formed composite product (void content), and the air flow path may be controlled by changing the basis weight of the organic fibers and/or glass content of the acoustic core layer 12. Additionally, the use of wet chopped strand glass in the dry-laid process as described above with respect to FIGS. 1 and 2 contributes to the improved sound absorption of the acoustic composite material 10 because the composite material formed by the dry-laid process has a higher loft (increased porosity). In addition, composite materials formed by the processes described herein have a uniform or substantially uniform distribution of reinforcing and organic fibers, thereby providing improved strength as well as improved acoustical and thermal properties, stiffness, and impact resistance.

It is another advantage that when wet use chopped strand glass fibers are used as the reinforcing fibers, the glass fibers may be easily opened and fiberized with little generation of static electricity due to the moisture present in the glass fibers. In addition, wet use chopped strand glass fibers are less expensive to manufacture than dry chopped fibers because dry fibers are typically dried and packaged in separate steps before being chopped. Therefore, the use of wet use chopped strand glass fibers allows the composite product (and acoustic composite material) to be manufactured with lower costs.

The acoustic composite material 10 reduces the cycle time, materials, and labor cost needed to provide acoustic products having desired acoustic and strength properties. For example, when automotive interior panels or load floors are conventionally manufactured, additional layers of materials are added to the panels/floors to increase the flexural strength of the panels/floors.

Because of the high strength and high flexural modulus of the acoustic composite material 10, there is no need to add a secondary material to the final acoustic product to achieve the desired strength. The elimination of these secondary materials reduces the amount of materials needed to form such interior acoustic and structural panels for automobiles and RVs and eliminates a manufacturing step (i.e., installing the secondary materials), thereby increasing overall productivity and decreasing cycle time.

In addition, the properties of the acoustic composite material 10 can be optimized for specific end-use applications by altering the amount and/or weight of the fibers in the different layers, by changing the glass content and/or length or diameter of the glass fiber, by altering the polymeric fiber length or denier, or by changing the formulations of the fibers in each of the layers during the manufacturing of the formed composite product.

In certain embodiments, for example, decreasing the weight and content of the organic fibers 210 in the acoustic core layer 12, allows for a decrease in the thickness of the acoustic core layer 12 without sacrificing the desired strength and flexural modulus of the acoustic composite material 10. The increased flexural strength of the composite material 10 allows the composite material to better resist deformation under load.

The use of the outer strengthening layer(s) 14, 16 reduces the amount of organic fibers 210 needed in the acoustic core layer 12. The acoustic material 10 has desirable properties that allow it to compete favorably with higher basis weight materials, but still be produced at faster rates, using fewer materials. In certain embodiments, the acoustic core layer 12 can have a weight distribution with basis weights ranging from about 400 to abut 2500 g/m$^2$, and in certain embodiments, can have a weight distribution of from about 600 to about 1000 g/m$^2$. The outer strengthening layer(s) 14, 16 can have a basis weight distribution ranging from about 100 to about 200 g/m$^2$.

EXAMPLES

In one example, an acoustic composite material 10 can have an acoustic core layer 12 with a basis weight of about 800 g/m$^2$ and first and second outer strengthening layers 14, 16 each having a basis weight of about 100 g/m$^2$, thus providing the acoustic composite material 10 with an overall basis weight of about 1000 g/m$^2$.

In another example, an acoustic composite material 10 can have an acoustic core layer 12 with a basis weight of about 1400 g/m$^2$ and first and second outer strengthening layers 14, 16, each having a basis weight of about 200 g/m$^2$, thus providing the acoustic composite material 10 with an overall basis weight of about 1800 g/m$^2$.

Figure 4:
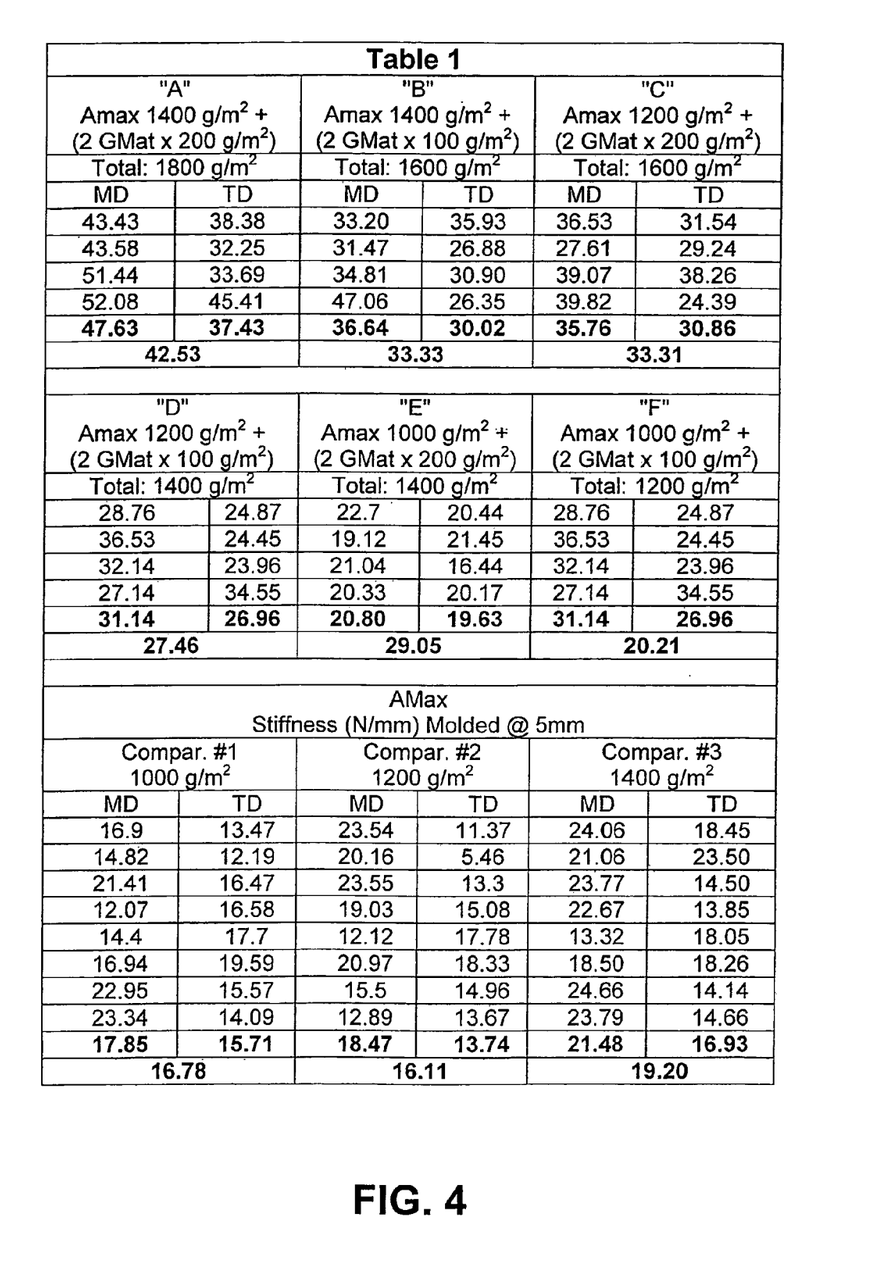
FIG. 4 is a table with data on different multilayer acoustic composite materials and acoustic core layers.

In still another example, an acoustic composite material 10 can have an acoustic core layer 12 with a basis weight of about 1000 g/m$^2$ and first and second outer strengthening layers 14, 16 having basis weights of about 100 g/m$^2$ and 200 g/m$^2$, respectively, thus providing the acoustic composite material 10 with an overall basis weight of about 1300 g/m$^2$ The data in the Table 1, shown in FIG. 4, shows a comparison between multilayer acoustic composite materials and acoustic core layers. In the examples shown in Table 1, the multilayer acoustic composite materials (AMax+GMat) are formed of different basis weight acoustic core layers (AMax) having different basis weight outer strengthening layers (GMat). In the examples shown in Table 1, the "AMax" acoustic core layers (Compar. #1, #2, #3) had basis weights of 1000 g/m$^2$, 1200 g/m$^2$ or 1400 g/m$^2$. The "AMax+GMat" multilayer acoustic composite materials had opposing outer strengthening layers having basis weights of 100 g/m$^2$ or 200 g/m$^2$.

The data in Table 1 show the stiffness (N/mm) molded @ 5 mm) in both the machine direction (MD) and the transverse direction (TD) for various examples. The acoustic composite materials have desirably high strength and high flexural modulus properties.

The composite materials A and B, having a 1400 g/m$^2$ core layer, had increases in stiffness of about 42% and 55%, respectively, over the 1400 g/m$^2$ core layer alone Compar. #3.

The composite materials C and D, having a 1200 g/m$^2$ core layer, had increases in stiffness of about 42% and 52%, respectively, increases in stiffness over the 1200 g/m$^2$ core layer alone Compar. #2.

The composite materials E and F, having a 1000 g/m$^2$ core layer, had increases in stiffness of about 17% and 42%, respectively, over the 1000 g/m$^2$ core layer alone Compar. #1.

The composite material 10 forms a final product that demonstrates improved structural and acoustical properties. Although not wishing to be bound by theory, the improved structural properties (e.g., strength and modulus properties) of the final composite material product are believed to be attributed to the various combinations of polymeric fibers and glass fibers of different physical properties (e.g., lengths and diameters) in the acoustical composite layer 12. It is also believed that the improved strength properties of the final part may be attributed glass fibers in the outer strengthening layers 14 and 16.

The high strength, high modulus acoustic composite material may be molded (e.g., thermo-formed or thermo-stamped) or die-cut to form a desired acoustical, semi-structural final product in a one step process.

The high strength, high modulus acoustic composite material optimizes the properties needed for specific applications by altering the weight of the fibers in the different layers or by changing the formulations of the fibers in each of the layers during the manufacturing of the product. The thickness of the formed composite product, porosity of the formed composite part (e.g., void content), and the air flow path may be controlled by changing the basis weight of the polymer fibers and/or glass content of the acoustical composite material.

While the compositions and methods of this invention have been described in terms of the foregoing illustrative embodiments, it will be apparent to those skilled in the art that variations, changes, modifications, and alterations may be applied to the compositions and/or methods described herein, without departing from the true concept, spirit, and scope of the invention.

The above descriptions of the preferred and alternative embodiments of the present invention are intended to be illustrative and are not intended to be limiting upon the scope and content of the following claims.

What is claimed is:

1. A method of forming an acoustic composite material comprising the steps of:
    providing an acoustic core layer formed of a composite material comprising dehydrated reinforcing fibers and organic fibers, said organic fibers having one or more of varying lengths and varying dernier to tune the acoustical behavior of said acoustic core layer to meet the needs of a desired application;
    providing two outer strengthening layers of glass fibers;
    positioning said acoustic core layer between said two outer strengthening layers;
    bonding said acoustic core layer to said outer strengthening layers to form an acoustic composite material; and
    simultaneously with the step of forming an acoustic composite material, compressing said acoustic composite material to reduce said acoustic core layer to a uniform thickness, the acoustic composite material having a uniform weight, a uniform strength, and uniform acoustic properties.

2. The method of claim 1, wherein the step of providing the acoustic core layer-includes:
    removing water from wet reinforcing fibers to form dehydrated reinforcing fibers,
    blending the dehydrated reinforcing fibers with the organic fibers to form a substantially homogenous mixture of the dehydrated reinforcing fibers and the organic fibers, and
    forming the mixture into the acoustic core layer.

3. The method of claim 2, wherein the bonding step comprises:
    bonding together at least some of the dehydrated reinforcing fibers and the organic fibers in the acoustic core layer, and
    bonding the outer strengthening layers to the acoustic core layer.

4. The method of claim 3, further comprising the step of at least partially opening bales of wet reinforcing fibers prior to the removing step.

5. The method of claim 3, wherein the wet reinforcing fibers in the acoustic core layer are wet chopped strand glass fibers.

6. The method of claim 1, further comprising the step of attaching a facing layer to at least one exposed major surface of an outer strengthening layer.

7. The method of claim 1, wherein the acoustic core layer is bonded to the outer strengthening layers by applying heat to the acoustic core layer and outer strengthening layers.

8. The method of claim 1, wherein the outer strengthening layers comprise chopped strand mats.

9. The method of claim 1, wherein the outer strengthening layers have the same densities and thicknesses.

10. The method of claim 1, wherein the acoustic core layer has a basis weight within the range of from about 800 $g/m^2$ to about 1400 $g/m^2$, and the outer strengthening layers each have a basis weight within the range of from about 100 $g/m^2$ to about 200 $g/m^2$.

11. The method of claim 1, wherein during the step of compressing the acoustic composite material, the thickness of the acoustic core layer is reduced to about 7 percent of its thickness prior to being compressed.

12. The method of claim 1, wherein said acoustic core layer has a first stiffness and said acoustic composite material has a second stiffness, and wherein the second stiffness of said acoustic composite material is within the range of from about 17 percent to about 55 percent greater than the first stiffness of said acoustic core layer.

13. A method of forming an acoustic composite material comprising:
    positioning an acoustic core layer next to a major surface of at least one outer strengthening layer, said acoustic core layer being formed of a composite material comprising dehydrated reinforcing fibers and organic fibers;
    bonding said acoustic core layer to said at least one outer strengthening layer to form an acoustic composite material; and
    simultaneously with the step of forming an acoustic composite material, compressing said acoustic composite material to reduce said acoustic core layer to a uniform thickness, said acoustic composite material having a uniform weight, a uniform strength, and uniform acoustic properties.

14. The method of claim 13, further comprising the step of forming the acoustic core layer prior to the positioning step, said forming step including:
    removing water from wet reinforcing fibers to form dehydrated reinforcing fibers,
    blending said dehydrated reinforcing fibers with said organic fibers to form a substantially homogenous mixture of said dehydrated reinforcing fibers and said organic fibers, and
    forming said mixture into said acoustic core layer.

15. The method of claim 14, wherein the bonding comprises:
    bonding together at least some of said dehydrated reinforcing fibers and said organic fibers in said acoustic core layer, and
    bonding said outer strengthening layers to said acoustic core layer.

16. The method of claim 15, wherein said outer strengthening layers comprise first and second outer strengthening layers and said first and second outer strengthening layers are applied to opposing surfaces of the acoustic core layer.

17. The method of claim 13, wherein said compression of said composite material occurs with said bonding.

18. The method of claim 13, wherein the acoustic core layer has a basis weight within the range of from about 800 g/m² to about 1400 g/m², and the outer strengthening layers each have a basis weight within the range of from about 100 g/m² to about 200 g/m².

19. The method of claim 13, wherein during the step of compressing the acoustic composite material, the thickness of the acoustic core layer is reduced to about 7 percent of its thickness prior to being compressed.

20. The method of claim 13, wherein said acoustic core layer has a first stiffness and said acoustic composite material has a second stiffness, and wherein the second stiffness of said acoustic composite material is within the range of from about 17 percent to about 55 percent greater than the first stiffness of said acoustic core layer.

21. A method of forming an acoustic composite material comprising:
    positioning an acoustic core layer next to a major surface of at least one outer strengthening layer, said acoustic core layer being formed of a composite material comprising dehydrated reinforcing fibers and organic fibers, said organic fibers having one or more of varying lengths and varying dernier to tune the acoustical behavior of said acoustic core layer to meet the needs of a desired application, and
    bonding said acoustic core layer to said outer strengthening layer to form an acoustic composite material; and
    simultaneously with the step of forming an acoustic composite material, compressing said acoustic composite material to reduce said acoustic core layer to a uniform thickness, said acoustic composite material having a uniform weight, a uniform strength, and uniform acoustic properties.

22. The method of claim 21, further comprising the step of forming the acoustic core layer prior to the positioning step, the forming step including:
    removing water from wet reinforcing fibers to form dehydrated reinforcing fibers,
    blending said dehydrated reinforcing fibers with said organic fibers to form a substantially homogenous mixture of said dehydrated reinforcing fibers and said organic fibers, and
    forming said mixture into said acoustic core layer.

23. The method of claim 22, wherein said bonding step comprises:
    bonding together at least some of said dehydrated reinforcing fibers and said organic fibers in said acoustic core layer, and
    bonding said outer strengthening layers to said acoustic core layer.

24. The method of claim 22, wherein said wet reinforcing fibers are wet use chopped strand glass fibers.

25. The method of claim 21, further comprising:
    compressing said composite material to reduce said acoustic core to a desired thickness.

26. The method of claim 25, wherein said compression of said composite material occurs with said bonding.

27. The method of claim 21, wherein the acoustic core layer has a basis weight within the range of from about 800 g/m² to about 1400 g/m², and the outer strengthening layers each have a basis weight within the range of from about 100 g/m² to about 200 g/m².

28. The method of claim 21, wherein during the step of compressing the acoustic composite material, the thickness of the acoustic core layer is reduced to about 7 percent of its thickness prior to being compressed.

29. The method of claim 21, wherein said acoustic core layer has a first stiffness and said acoustic composite material has a second stiffness, and wherein the second stiffness of said acoustic composite material is within the range of from about 17 percent to about 55 percent greater than the first stiffness of said acoustic core layer.

30. A method of forming an acoustic composite material comprising the steps of:
    providing an acoustic core layer formed of a composite material comprising dehydrated reinforcing fibers and organic fibers, said acoustic core layer having a basis weight within the range of from about 800 g/m² to about 1400 g/m²;
    providing two outer strengthening layers of glass fibers, said outer strengthening layers each having a basis weight within the range of from about 100 g/m² to about 200 g/m²;
    positioning said acoustic core layer between said two outer strengthening layers;
    bonding said acoustic core layer to said outer strengthening layers to form an acoustic composite material; and
    compressing said acoustic composite material to reduce said acoustic core layer to a uniform thickness, the acoustic composite material having a uniform weight, a uniform strength, and uniform acoustic properties.

31. A method of forming an acoustic composite material comprising the steps of:
    providing an acoustic core layer formed of a composite material comprising dehydrated reinforcing fibers and organic fibers, said organic fibers having one or more of varying lengths and varying dernier to tune the acoustical behavior of said acoustic core layer to meet the needs of a desired application, said acoustic core layer having a first stiffness;
    providing two outer strengthening layers of glass fibers;
    positioning said acoustic core layer between said two outer strengthening layers;
    bonding said acoustic core layer to said outer strengthening layers to form an acoustic composite material, said acoustic composite material having a second stiffness; and
    compressing said acoustic composite material to reduce said acoustic core layer to a uniform thickness, the acoustic composite material having a uniform weight, a uniform strength, and uniform acoustic properties;
    wherein the second stiffness of said acoustic composite material is within the range of from about 17 percent to about 55 percent greater than the first stiffness of said acoustic core layer.

* * * * *